Oct. 4, 1927.
J. C. LEDBETTER
1,644,298
CABLE CONNECTER
Filed Jan. 22, 1924
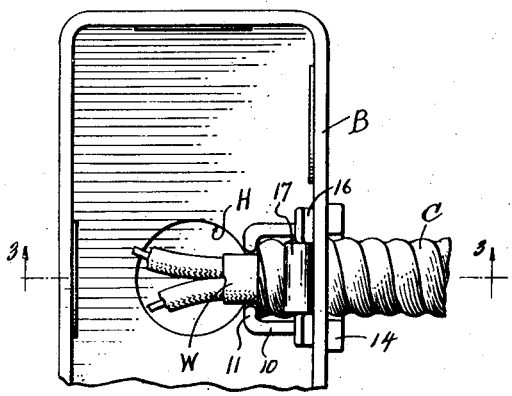
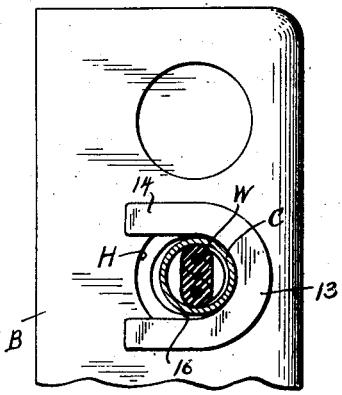
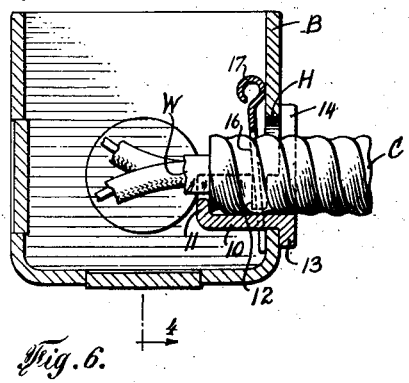
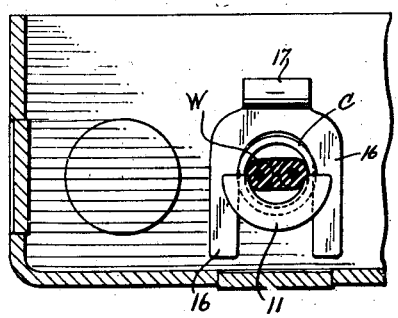
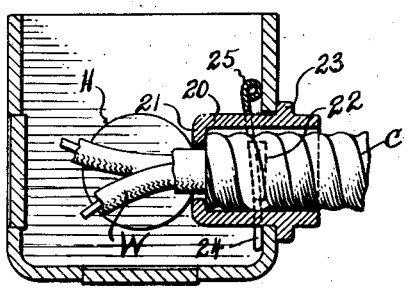
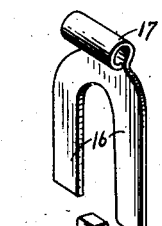
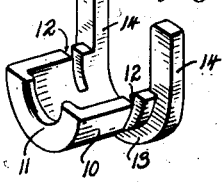
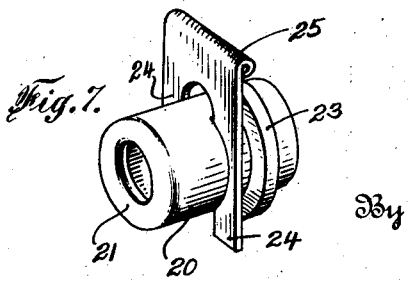
Inventor
James C. Ledbetter
By Attorneys Patented Oct. 4, 1927.

1,644,298

UNITED STATES PATENT OFFICE.

JAMES C. LEDBETTER, OF BROOKLYN, NEW YORK, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,777.

This invention relates to combination cable connecters and outlet boxes, and especially to improvements in connecters for use in joining electric cables to outlet box fixtures and the like.

An object of the invention is to produce improved combinations as aforesaid, and particularly to produce an improved cable connecter of simple structure which is capable of being manufactured at low cost and without machining, finishing, or threading operations, and which positively anchors itself in a box hole and secures a cable to standard round knock-out holes in the usual run of electric fixture boxes such as cable and outlet boxes, switch and fuse boxes, and others.

The accompanying drawing illustrates a preferred form of the invention, the construction of which may be suitably varied or modified to meet the requirements of manufacturers and users without departing from the scope and principle of my invention.

Figure 1 is a plan view of an open electric fixture box showing a cable connected thereto by using my improved cable connecter; and Figure 2 is an outside end elevation thereof.

Figure 3 shows a sectional view developed on the line 3—3 of the drawing; and Figure 4 shows a sectional view as on the line 4—4 through the box and rear or inside end elevation of the connecter in position.

Figure 5 illustrates a perspective view of an improved cable connecter removed from the box with its two parts disposed in spaced relation.

Figures 6 and 7 show modified forms of the invention as assembled in the box and removed therefrom.

To those conversant with the art it is understood how electric fixture boxes B are usually manufactured with knock-out holes H, and electric conduit or cable C carrying wires W is secured in the knock-out holes H by means of connecters. Accordingly, it is fitting that the primary object of my invention as aforesaid is to produce improved connecters for this purpose.

Referring now more particularly to Figure 5 for a description of the construction of the connecter parts, it is pointed out that the connecter essentially comprises two elements which engage to simultaneously anchor the cable and itself in the box B. An arcuate trough-shaped support member in the form of a cradle 10 may include a bushing 11 made on one end thereof against which the cable C rests when the parts are assembled. The connecter member 10 is likewise provided with notches 12 made in each side thereof and extending circumferentially part of the way around the said member, and preferably two slots 12 are provided in opposite aligned relation.

A U-shaped rib or shoulder 13 is made on the other end of the connecter member 10 and possesses upstanding box hole covering legs 14 thus providing a U-shaped end on the member 10 in spaced relation from the notches 12. The distance between the slots or notches 12 and the inner face of the U-shaped rib 13—14 is substantially equal to the thickness of the box wall B.

An anchorage plate or forked key is made with legs 16 and a curled head 17 is formed on the upper end of this part. The distance between the two legs 16 may be substantially equal to the diameter of the cable C or even slightly less in order that the inner edges of the key 16 may frictionally burr or bite into the cable wall when the parts are assembled. The locking key 16 is stamped from sheet metal of comparatively light gauge thus providing thin or sharp confronting edges for gripping the cable; and in some forms of construction I prefer to make the anchorage legs 16 with the internal edges thereof disposed at a slight angle whereby the legs or prong parts 16 slightly diverge in order that the cable be more tightly gripped as the bifurcated key is driven downwardly into locking position.

In describing the assembly of the connecter shown in Figure 5, reference is made to Figures 1 to 4 inclusive; and the connecter 10 is inserted in the box hole H with the rib 13—14 disposed against one side of the box wall whereupon the cable C is set in position as shown, and thereafter the anchorage fork 16 is passed into the slots or notches 12 straddling the cable C. One or two light taps of a hammer drives the key in position with the inner knife-like edges of the key frictionally engaging the cable wall. The head 17 of the locking key is made substantially large thereby causing it to rub against the box wall opposite to that against which rests the flanged connecter end 14. The lower end of the anchorage fork 16 engages the box wall below the member 10, and in this position both the upper and lower ends thereof are caused to frictionally engage with increasing pressure against box wall B as it is driven downwardly thus tightly pressing the rib 13—14 against the box with a resulting wedging and drawing action serving to set up the shoulder 13—14 tightly against the outer box wall and over the box hole H to partly cover the box opening while the key acts to cover the remaining part of the box opening from the inside; and in this way the two connecter parts perform the three purposes of anchoring the cable to the connecter, securing the connecter in the box, and covering over the box opening H.

Figures 6 and 7 show a modified form of the invention in that the main part of the connecter member is made substantially tubular or cylindrical in shape and comprises a sleeve 20 having a bushing 21 at the end thereof with opposite slots or notches 22 formed in the sleeve at a slight angle to the axis thereof. The rear end of the sleeve is made with an abutment rib 23 adapted to fit tightly against the box wall as heretofore described. The slots 22 are preferably disposed at an angle for the purpose of facilitating the tightening and wedging of the sleeve 20 with its rib 23 in and against the box when the locking key is driven down in position.

A stamped locking key comprising a forked structure 24 has a head 25 made on the upper end thereof which frictionally engages the inner walls of the box. When the locking or connecter anchorage key 24 is driven downwardly into the angularly directed slots there follows a wedging action by virtue of the extremities of the part, the head and prong ends, rubbing against the box. This wedging action forcibly draws the sleeve rib 23 inwardly to form a tight fitting connection between the box and sleeve and the sleeve rib and flat key cover over the box opening H. Inasmuch as the distance between the inner edges of the legs 24 is less than the inner diameter of the sleeve 20, it follows that the prong parts 24 burr or bite into the cable thereby firmly anchoring it within the sleeve and at the same time the spread of the rib and plate key 24 across the box wall cable opening fastens the cable connecter sleeve to the box.

It is now understood that my improved connecter 10 or 20 includes an integral box hole edge abutment 14 or 23 which rests or abuts against one side of the box adjacent the hole H thereof, and a separate anchorage key provides a removable abutment which rests against the other side of the box wall. Thus the box wall is disposed between the two abutments 14 and 16. The anchorage abutment plate simultaneously performs two or more functions namely, that of gripping the cable C to secure it in the connecter and in the box hole, and that of anchoring the connecter itself in the box hole.

What I claim is:—

1. Cable and box connecting means comprising, a box having a cable and connecter receiving hole, a member mounted therein and formed to expose the cable, including means abutting one side of a box wall, and an anchorage plate cooperating with the box wall gripping against the exposed cable engaging the member and abutting the other side of a box wall.

2. Cable and box connecting means comprising, a box having a cable and connecter receiving hole, a cable receiving member placed in the box hole and including an abutment resting against one side of the box, said member having a notched opening therein on the other side of the box adjacent the box wall, and a separate anchorage plate projecting through the notched opening gripping against the cable and resting against the box wall.

3. Cable and box connecting means comprising, a box having a cable and connecter receiving hole, a connecter mounted in the box hole and including abutment means resting against one side of the box, and including opposite notches exposing the cable on the other side of the box wall, and an anchorage fork disposed astride the connecter and including spaced prongs projecting into the notches gripping against the exposed cable and resting against the box wall.

4. A connecter comprising, a cable receiving member adapted to fit into a box hole, including means to abut against one side of a box wall and formed to expose the cable, and a separate anchorage member cooperating with the member gripping against the exposed cable and adapted to abut the other side of a box wall.

5. A connecter comprising a member formed to expose a cable resting therein and including abutment means adapted to rest against one side of a box wall, and an anchorage fork having prongs which straddle the member to grip against the exposed cable.

6. A connecter comprising, a member to support a cable and including a flanged end to rest against one side of a box wall, said member having two oppositely disposed notches spaced from the flange a distance substantially equal to the thickness of a box wall and through which is exposed the cable, and a forked anchorage plate disposed astride the member and in the notches.

7. A connecter as defined in claim 6 wherein the notches are formed in the member at an angle to a box wall which causes an end of the anchorage fork to bear against a box wall with increasing pressure when driven into the notches.

In testimony whereof I affix my signature.

JAMES C. LEDBETTER.